US012640518B2

(12) United States Patent
Kosmalski et al.

(10) Patent No.: US 12,640,518 B2
(45) Date of Patent: May 26, 2026

(54) CONNECTOR ARRANGEMENT

(71) Applicant: TE Connectivity Germany GmbH, Bensheim (DE)

(72) Inventors: Christoph Kosmalski, Bensheim (DE); Maximilian Veihl, Bensheim (DE); Florin Spataru, Bensheim (DE); Markus Eckel, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 346 days.

(21) Appl. No.: 18/360,132

(22) Filed: Jul. 27, 2023

(65) Prior Publication Data

US 2024/0039212 A1 Feb. 1, 2024

(30) Foreign Application Priority Data

Jul. 27, 2022 (DE) ......................... 102022118880.9

(51) Int. Cl.

| | |
|---|---|
| ***H01R 13/62*** | (2006.01) |
| ***H01R 13/629*** | (2006.01) |
| ***H01R 13/641*** | (2006.01) |
| ***H01R 13/70*** | (2006.01) |

(52) U.S. Cl.

CPC ..... *H01R 13/62955* (2013.01); *H01R 13/641* (2013.01); *H01R 13/70* (2013.01)

(58) Field of Classification Search

None

See application file for complete search history.

(56) References Cited

U.S. PATENT DOCUMENTS

| | | | | |
|---|---|---|---|---|
| 4,871,323 | A | 10/1989 | Ohsumi | |
| 10,163,590 | B2 * | 12/2018 | Tabata | H01R 13/701 |
| 10,297,945 | B2 | 5/2019 | Yamane | |

(Continued)

FOREIGN PATENT DOCUMENTS

| | | | |
|---|---|---|---|
| DE | 102012018271 | A1 | 3/2014 |
| DE | 102019212431 | B3 | 11/2020 |

(Continued)

OTHER PUBLICATIONS

Korean Office Action dated Oct. 28, 2024 with English translation, corresponding to Application No. 10-2023-0097646, 10 pages.

(Continued)

*Primary Examiner* — Ross N Gushi

(74) *Attorney, Agent, or Firm* — Barley Snyder

(57) ABSTRACT

An electrical connector assembly includes an electrical plug connector and a mating plug connector. The electrical plug connector includes a connector housing, and a housing interlock element movable relative to the connector housing between a pre-latched position and a final latched position. The housing interlock element includes a switching element. The mating plug connector is securable to the connector housing via the housing interlock element, and includes a receiving element adapted to receive the housing interlock element. The receiving element comprises two electrical contacts of an electrical interlock circuit. The switching element is adapted to electrically connect the two electrical contacts when the housing interlock element is moved into the final latched position.

20 Claims, 7 Drawing Sheets

(56) References Cited

U.S. PATENT DOCUMENTS

| | | | |
|---|---|---|---|
| 2013/0095692 A1 | 4/2013 | Cole | |
| 2015/0171551 A1 | 6/2015 | Iwatani | |
| 2016/0156139 A1 | 6/2016 | Shendge et al. | |
| 2017/0077639 A1 | 3/2017 | Sundarakrishnamachari et al. | |
| 2019/0296485 A1 | 9/2019 | Masuda et al. | |

FOREIGN PATENT DOCUMENTS

| | | | |
|---|---|---|---|
| JP | 2012195309 | A | 10/2012 |
| JP | 201967714 | A | 4/2019 |
| KR | 101479054 | B1 | 1/2015 |
| WO | 2010150975 | A1 | 12/2010 |

OTHER PUBLICATIONS

Office Action from the Deutsches Patent- und Markenamt dated Mar. 7, 2023, corresponding to Application No. 10 2022 118 880.9, 32 pages.

Extended European Search Report dated Nov. 29, 2023, corresponding to Application No. 23186917.3-1201, 12 pages.

* cited by examiner

CONNECTOR ARRANGEMENT

CROSS-REFERENCE TO RELATED APPLICATIONS

This application claims the benefit of German Patent Application No. 102022118880.9, filed Jul. 27, 2022, the whole disclosure of which is incorporated herein by reference.

FIELD OF THE INVENTION

Embodiments of the present disclosure relate to a connector assembly including an electrical plug connector and a mating plug connector.

BACKGROUND

Connector assemblies consisting of an electrical plug connector and a mating plug connector for electrical power transmission are known in which a housing interlock element, also called a connector position assurance (CPA) element, protects the connection between the plug connector and the mating plug connector by preventing unintentional disconnection. In automotive applications, for example, connector assemblies can be subject to high vibration loads. In these applications, the housing interlock elements help to achieve required connection reliability.

More specifically, it is known to arrange housing interlock elements on an electrical plug connector movably between a pre-latched position, in which the assembly connection is unprotected, and a final latched position, in which the assembly connection is protected or securely joined. In the pre-latched position in which the electrical plug connector is preferably supplied, the housing interlock element typically blocks an incorrect assembly connection due to additional positive locking features. In the final latched position, the housing interlock element typically prevents unintentional decoupling of the connector assembly.

Further, particularly in high-voltage applications (e.g., in automotive applications at a DC voltage of over 60 V), it is known to protect the current transmission by means of an interlock circuit, also called interlock loop or high-voltage interlock system (HVIL). The interlock circuit is adapted to signal the electrical coupling of the electrical plug connector with the mating plug connector by means of a leading signal contact, so that a relay of an associated switching system on the mating plug connector side activates the electrical current transmission. In addition to the power transmission contacts, a comparatively shorter signal contact is arranged in a plug connector for this purpose. The shorter signal contact closes the interlock circuit only when the connector assembly has been joined up to predetermined point.

However, in known solutions, the interlock circuit is already closed and current transmission enabled even if the connector assembly is not yet fully interlocked and protected. In this case, there is a risk that an electric arc may prematurely or in a poorly connected connector assembly falsely signal the switching system to switch on the interlock circuit.

It is therefore the object of the invention to provide an improved protected connector assembly addressing these drawbacks.

SUMMARY

According to an embodiment of the present disclosure, an electrical connector assembly includes an electrical plug connector and a mating plug connector. The electrical plug connector includes a connector housing, and a housing interlock element movable relative to the connector housing between a pre-latched position and a final latched position. The housing interlock element includes a switching element. The mating plug connector is securable to the connector housing via the housing interlock element, and includes a receiving element adapted to receive the housing interlock element. The receiving element comprises two electrical contacts of an electrical interlock circuit. The switching element is adapted to electrically connect the two electrical contacts when the housing interlock element is moved into the final latched position.

BRIEF DESCRIPTION OF THE DRAWINGS

The invention will now be described by way of example with reference to the accompanying Figures, of which.

DETAILED DESCRIPTION OF THE EMBODIMENTS

Figure 1A:
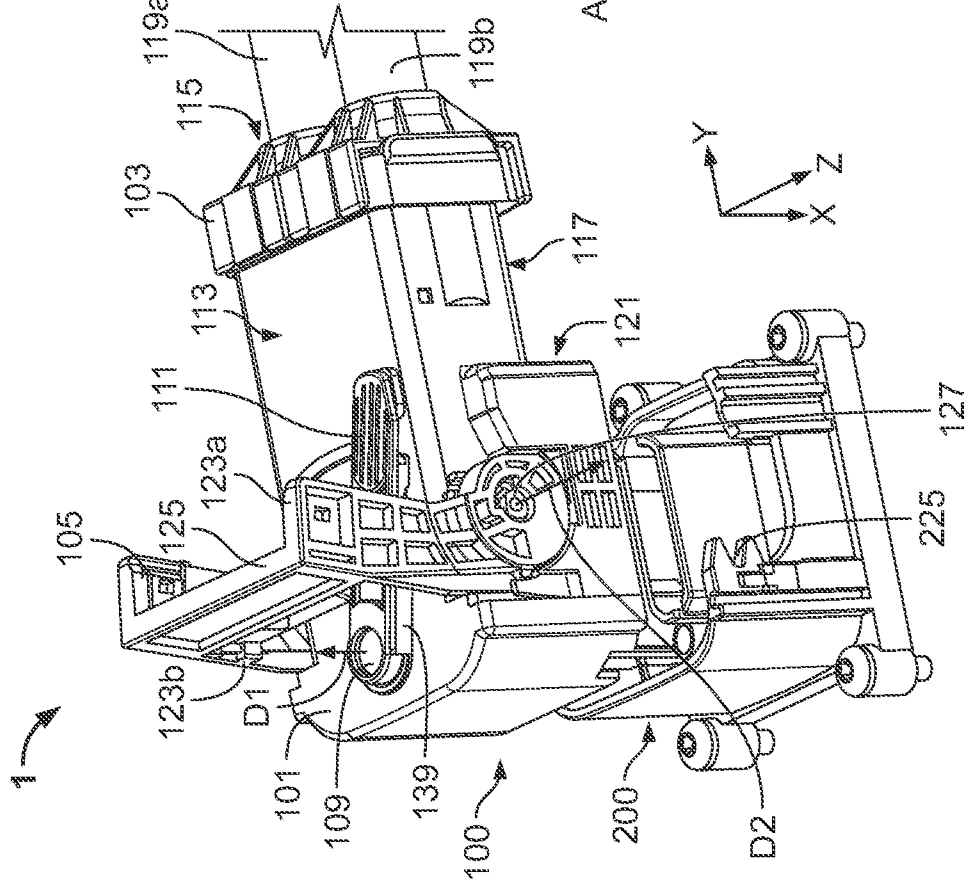
FIG. 1A shows a connector assembly according to a preferred configuration of the invention, in which a plug connector and a mating plug connector are in an unplugged state.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
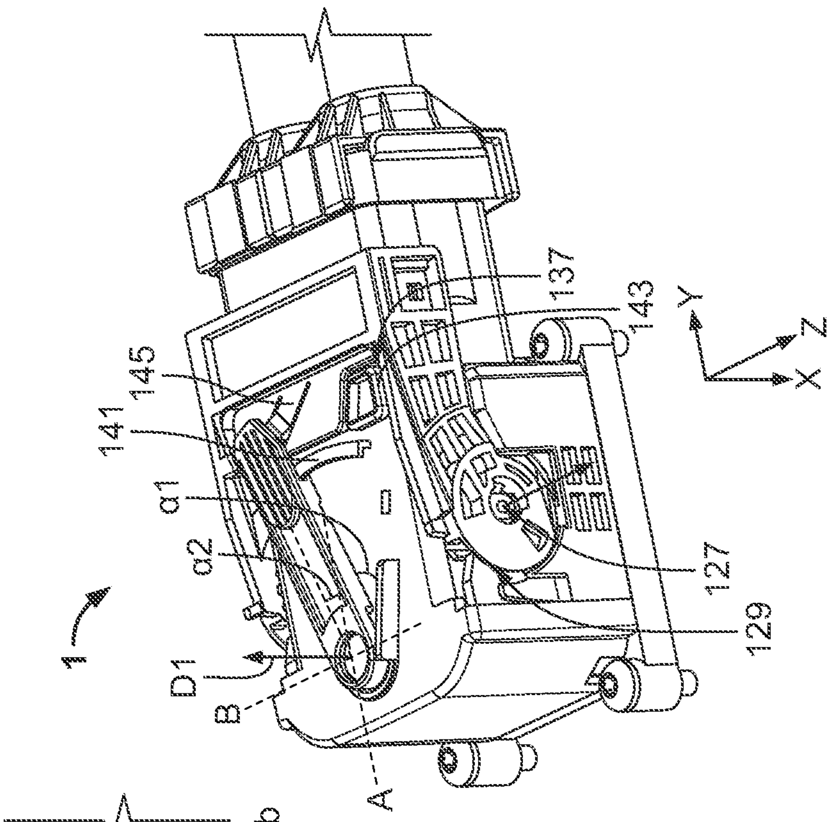
FIG. 1B shows the connector assembly of FIG. 1A in a coupled and protected final state.

FIGS. 1A and 1B show a connector assembly 1 comprising an electrical plug connector 100 and a mating plug connector 200 according to an embodiment of the present disclosure. In the exemplary embodiment, the connector assembly 1 is an automotive power transmission connector for electrical voltages of over 60V. The plug connector 100 comprises a connector housing 101, a rear housing cover 103, a lever 105 and a housing interlock, or called connector position assurance (CPA), element 109. A substantially planar actuating element 111 of the housing interlock element 109 is arranged on an outer surface 113 of the plug connector 100, which is turned in the opposite direction, or a direction normal to, to the plug-in direction x, so as to be rotatable about a first axis of rotation D1 extending parallel to the plug-in direction x. This actuation element 111 is used for manual actuation of the housing interlock element 109.

The housing cover 103 covers an opening 115 in a first region 117 of the connector housing 101 of the plug connector 100, which faces away from a plug-in region. The first region 117 of the connector housing 101 is configured along a body direction y orthogonal to the plug-in direction x. The opening 115 is for receiving at least two cables for insulated current conductors 119*a*, 119*b*. The housing cover 103 encloses the received cables 119*a*, 119*b* and preferably covers the opening 115 in a waterproof manner. Arranged within the connector housing 101 and not visible in FIGS. 1A, 1B are current transfer contacts to which the ends of the current conductors in the cables 119*a*, 119*b* received through the opening 115 are conductively attached, for example crimped.

The first region 117 is arranged substantially perpendicular to a second region 121 of the housing 101. In this embodiment, the plug connector 100 is a right-angled, so-called 90° exit connector. Both the first region 117 and the second region 121 have a rectangular cross-section in this embodiment. The second region 121 holds the contact terminals of the current transmission contacts and is suitable for being plugged onto the mating plug connector 200 for coupling the connector assembly 1. However, other configurations of the connector geometry are also possible.

The lever 105 comprises two lever arms 123*a*, 123*b* and a cross beam 125 which is suitable for operation and is adapted, in particular, to be flat. The cross beam 125 has a recess 137. The lever arms 123*a*, 123*b* are connected to the cross beam 125 at their first end, which faces at least partially in the body direction y. At their second end, which faces at least partially counter to the body direction y, the lever arms 123*a*, 123*b* are arranged rotatably about respective pivot pins 127. The pivot pins 127 are arranged along a second axis of rotation D2 running through the connector housing 101 transversely to the plug-in direction x.

Engagement lugs 129 are also configured to face outwardly at the second end of the lever arms 123*a*, 123*b*, which are arranged about pivot pins 127. The engagement lugs 129, not visible in FIG. 1B, are suitably arranged to engage corresponding lever handle notches 225 in the mating plug connector 200. Upon rotation of the lever 105 about pivot pin 127, engagement of the engagement lugs 129 with corresponding lever handle notches 225 may generate a pushing force in the plug-in direction x and promote coupling of the connector assembly.

In FIG. 1A, the connector assembly 1 is in a not yet plugged-in state. The plug connector 100 is only approaching the mating plug connector 200 in a plug-in direction x and is not yet coupled thereto. The actuation element 111 is in a first rotational position, which corresponds to the pre-latched position of the housing interlock element 109. In the first rotational position, the actuation element 111 is positioned at a first angle $\alpha 1$ (see FIG. 1B). The angle $\alpha 1$ is preferably between 10° and 40° with respect to the body direction y. The lever 105 is in a first lever position, or open lever position. In the first lever position, the coupling between the plug connector 100 and the mating plug connector 200 can be initiated. In this position, the lever arms 123*a*, 123*b* are aligned substantially parallel to the plug-in direction x. In particular, the lever arms 123*a*, 123*b* are configured such that the engagement lugs 129 can be moved past the lever handle notches 225 without blocking the coupling of the connector assembly 1. FIG. 1A further shows a stop element 139 arranged on the surface 113. The stop element 139 blocks rotation of the actuation element 111 in the opposite direction of rotation of the axis of rotation D1 beyond the angle $\alpha 1$.

FIG. 1B shows the connector assembly of FIG. 1A in a coupled and secured final state. The plug connector 100 is fully plugged onto the mating plug connector 200. The connector housing 101 is positively attached to the mating connector housing 201. The lever 105 is in a second, or closed, lever position. In the second lever position, the lever arms 123*a*, 123*b* are aligned substantially parallel to the body direction y. The actuation element 111 of the housing interlock element 109 has been pivoted about the axis of rotation D1 and is in a second rotational position, which corresponds to the final latched position of the housing interlock element 109.

In the second rotational position, the actuation element 111 is positioned at a second angle $\alpha 2$ with respect to the body direction y. Preferably, the second angle $\alpha 2$ has the same magnitude as the first angle $\alpha 1$ in the opposite direction of rotation about D2. FIG. 1B shows that the actuation element 111 positively blocks the movement of the cross beam 125 in the second rotational position. FIG. 1B further shows that the plug connector 100 also includes a latching element 141, a support element 143 and a securing element 145. The latching element 141 and the support element 143 are arranged on the outer surface 113 of the plug connector 100. The securing element 145 is arranged on the cross beam 125 of the lever 105 centrally and protruding from the surface of the cross beam 125. In particular, the securing element 145 is mounted resiliently with respect to the cross beam 125 so that it can be moved manually, for example along the plug-in direction x. In the final latched position shown in FIG. 1B, the actuation element 111 is positively locked by the securing element 145. The latching element 141 positively holds the actuation element 111 along the rotation about D2 in the y-z plane and blocks bending against the plug-in direction x. The support element 143 supports one end of the actuation element 111 in the y-z plane in the first rotational position and prevents bending of the actuation element 111 in the plug-in direction x.

Figure 1C:
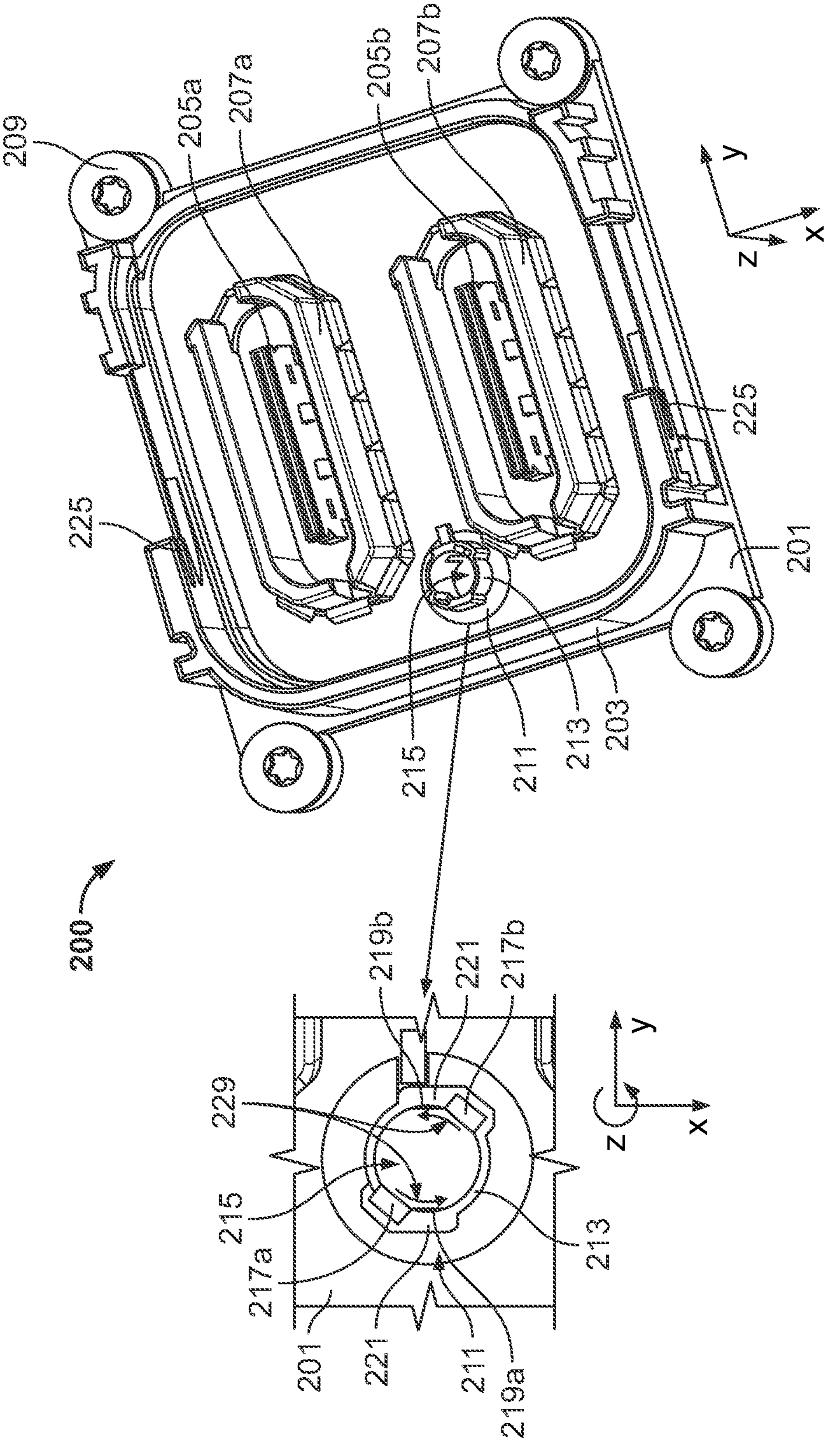
FIG. 1C shows the mating connector of the connector assembly alone, with a detailed view of a receiving element for the housing interlock element.

FIG. 1C shows the mating plug connector 200. A rectangular base 201 carries a mating connector housing 203, as well as two contact terminals 205*a*, 205*b* for current transmission, which are surrounded by respective support bodies 207*a*, 207*b*. Screws 209 are arranged at the four respective corners for fixing the mating plug connector 200 to a device. The lever handle notches 225 in the mating connector housing 203 are configured to receive the engagement lugs 129 of the lever 105.

A receiving element 211 is arranged within the mating connector housing 203 in the x-y plane, here for example between the two contact terminals 205*a*, 205*b*. The receiving element 211 is provided with a guide body 213 having an opening 215 for receiving and inserting the housing interlock element 109. The guide body 213 is configured to be tubular along the plug-in direction x, and is provided with two notches 217*a*, 217*b* extending along the plug-in direction x. The notches 217*a*, 217*b* are grooves for guiding the housing interlock element 109, in particular, as explained in detail later with reference to FIGS. 2A, 2B, for guiding projecting ends 135*a*, 135*b* of a switching element formed as an electrically conductive element 131.

In the detailed view of FIG. 1C, the receiving element 211 is shown in cross-section along the x-z plane normal to the plug-in direction x, at the level of the base 201. Two electrical contacts 219*a*, 219*b* of an interlock circuit, also called an interlock loop or high-voltage interlock system (HVIL), are arranged at the opening 215 of the receiving element 211. A closed interlock circuit allows a leading signal contact to signal the correct electrical coupling of the electrical plug connector 100 to the mating plug connector 200, so that a relay of an associated switching system on the mating plug connector side activates the electrical power transmission via the cables 119*a*, 119*b*. The two contacts 219*a*, 219*b* are arranged opposite each other in the x-y plane at the opening 215 such that the ends protrude into the opening 215 as shown in FIG. 1C.

Figure 2A:
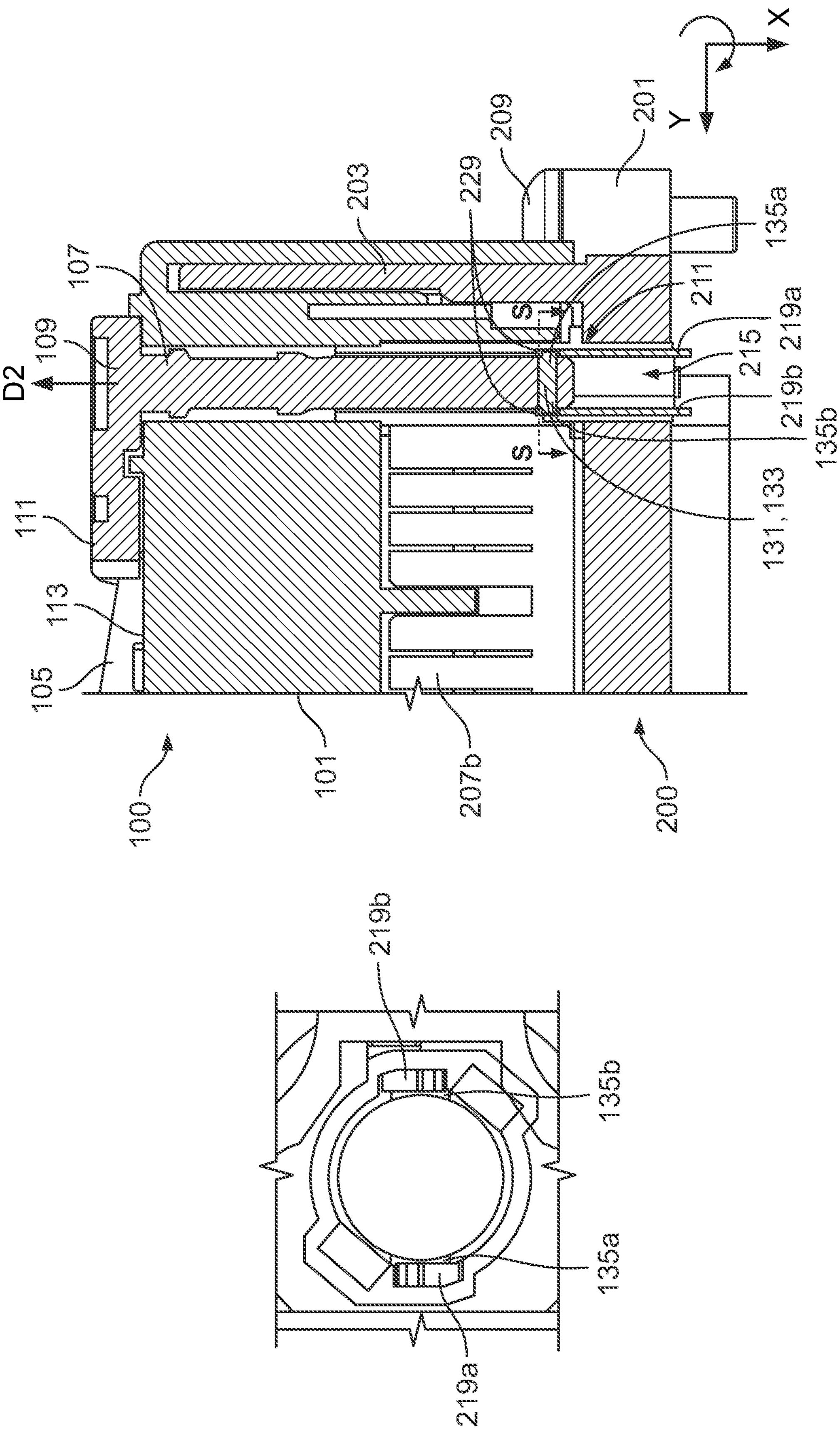
FIG. 2A shows a first cross-section of the connector assembly in the final state along the sectional axis A of FIG. 1B.
Figure 2B:
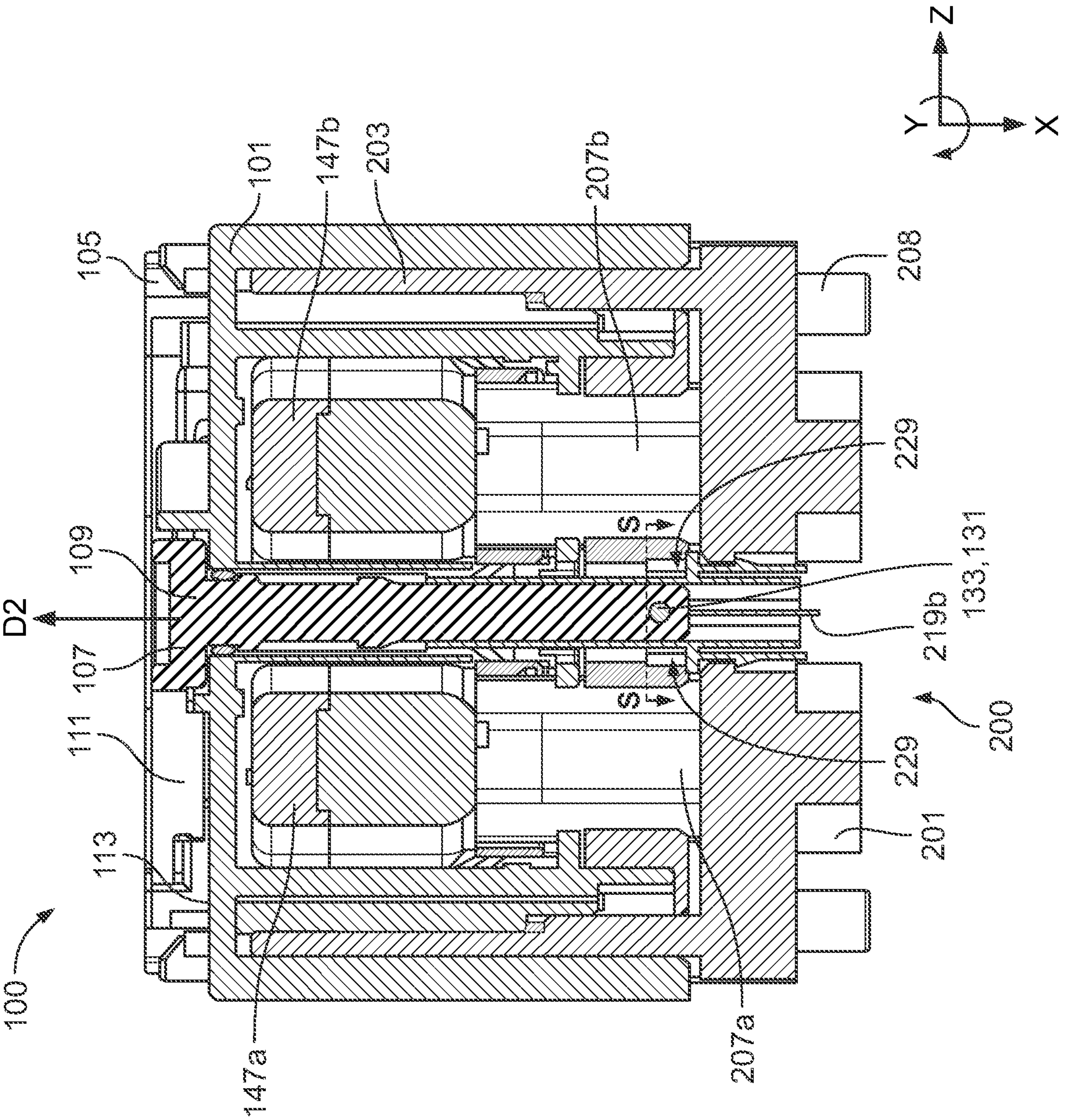
FIG. 2B shows a second cross-section of the connector assembly in the final state along the sectional axis B of FIG. 1B.

Furthermore, the detailed view of FIG. 1C shows in cross-section the boundaries of the notches 217*a*, 217*b*, as well as the boundaries of the guide body 213 on the base 201. The notches 217*a*, 217*b* in the guide body 213 are arranged around the opening 215 opposite each other on an axis which, in this embodiment, is offset by 45° with respect to the body direction y. A thickened part 221 of the guide body 213, as can be seen in FIGS. 2A, 2B, allows the formation of a rotational cavity 229 which creates a space for movement and a form fit against the plug-in direction x for the ends 135*a*, 135*b* of the electrically conductive element 131 described later. The thickened part 221 creates a space which in cross-section connects the notches 217*a*, 217*b* to the electrical contacts 219*a*, 219*b* arranged along the body direction y.

FIGS. 2A and 2B show cross-sectional views of the connector assembly 1 in the final latched state corresponding to FIG. 1B. FIG. 2A shows the second region of the arrangement 1 in a cross-sectional view along the sectional axis A of FIG. 1B. FIG. 2B shows the arrangement in a cross-sectional view along the sectional axis B of FIG. 1B.

FIGS. 2A and 2B show, as already described with reference to FIGS. 1A and 1B, the housing 101 of the plug connector 100, the lever 105, and the housing interlock element 109. The mating plug connector 200 includes the base 201, the mating connector housing 203, the support bodies 207*a*, 207*b* for the current transfer contacts, and the receiving element 211. Screws 209 for fixing the mating plug connector 200 to a device are further shown. In particular, FIGS. 2A and 2B show the structure of the housing interlock element 109, which includes a pin-shaped body 107 and an electrically conductive element 131 in addition to the actuation element 111.

At its first end opposite the plug-in direction x, the pin-shaped body 107 is firmly connected to the actuation element 111 arranged externally on the housing 101, in particular configured in one piece. The pin-shaped body 107 extends along the axis of rotation D2 running parallel to the plug-in direction x. In this embodiment, the pin-shaped body 107 is configured circularly symmetrical about its axis D2. In alternative configurations, the pin-shaped body 107 is not circularly symmetrical, for example due to additional positive locking elements formed on the surface of the pin-shaped body 107.

The electrically conductive element 131 is arranged at the second end of the pin-shaped body 107 facing in the plug-in direction x, for example via a positive connection. The electrically conductive element 131 has a metallic pin 133 with two ends 135*a*, 135*b*. The ends 135*a*, 135*b* project with respect to the pin-shaped body 107 transversely to the plug-in direction x and are configured as projections. The metallic pin 133 extends centrally through the pin-shaped body 107 of the housing interlock element 109. The electrical contacts 219*a*, 219*b* of the mating plug connector 200 extend along the plug-in direction x through the base 201. In particular, they extend along an inner surface of the receiving element 211 forming the opening 215 to the level of the ends 135*a*, 135*b*. In FIG. 2A, the housing interlock element 109 is in the final latched state and the ends 135*a*, 135*b* are in electrically conductive contact with the ends of the electrical contacts 219*a*, 219*b* of the mating plug connector 201. Instead of a pin 133 passing through the pin-shaped body 107, electrical elements of a different shape may be used, such as a ring section extending on the outside of the pin-shaped body 107 and extending over an angular section of 180°.

The connector housing 101 is fitted onto the mating connector housing 203 such that the pin-shaped body 107 of the housing interlock element 109 is inserted into the receiving element 211. At the same time, the supporting bodies 207*a*, 207*b* for the contact terminals 205*a*, 205*b* (see FIG. 1*c*) receive respective sleeves 147*a*, 147*b* for the power transmission contacts, not visible in the figure, which are associated with the cables 119*a* and 119*b* of the plug connector 100.

In FIGS. 2A and 2B, the connector assembly 1 is shown in a final latched state. The lever 105 is closed in the second lever position. In the second lever position, the lever 105 abuts the outer housing surface 113 parallel to the body direction y. The housing interlock element 109 is in the second rotational position, in which the electrically conductive element 131 is aligned parallel to the x-y plane. In particular, the ends 135*a*, 135*b* of the electrically conductive element 131 are located in the rotational cavity 229 in the guide body 213 of the receiving element 211.

A cross-sectional view along the sectional axis S of FIGS. 2A and 2B shows the receiving and contact area of the housing interlock element 109 in magnified detail. As explained above, it can be seen that in the final latched state, the ends 135*a*, 135*b* abut the ends of the electrical contacts 219*a*, 219*b* of the interlock circuit in the receiving element 211. Thus, an electrical contact is created, thereby closing the interlock circuit.

The ends 135*a*, 135*b* project from the pin-shaped body 107 in the body direction y transverse to the plug-in direction x. Thus, they are adapted to be inserted into the notches 217*a*, 217*b* when the plug connector 100 is mated and to maintain the rotational orientation of the housing interlock element 109 in the receiving element 211 when the pin-shaped body 107 is inserted into the guide body 213. As can be seen from FIG. 2A, the projecting ends 135*a*, 135*b*, are adapted to be received in the rotational cavity 229 extending transversely to the plug-in direction x in the guide body 213 of the receiving element 211. Thus, a positive locking of the plug connector 100 against the plug-in direction x is obtained when the housing interlock element 109 in the receiving element 211 is rotated out of the first rotational position as described below.

With reference to FIGS. 3A to 5B, it will be explained how the electrical plug connector 100 is fully coupled to the mating plug connector 200 to finally achieve the final latched state described in FIGS. 2A and 2B.

Figure 3B:
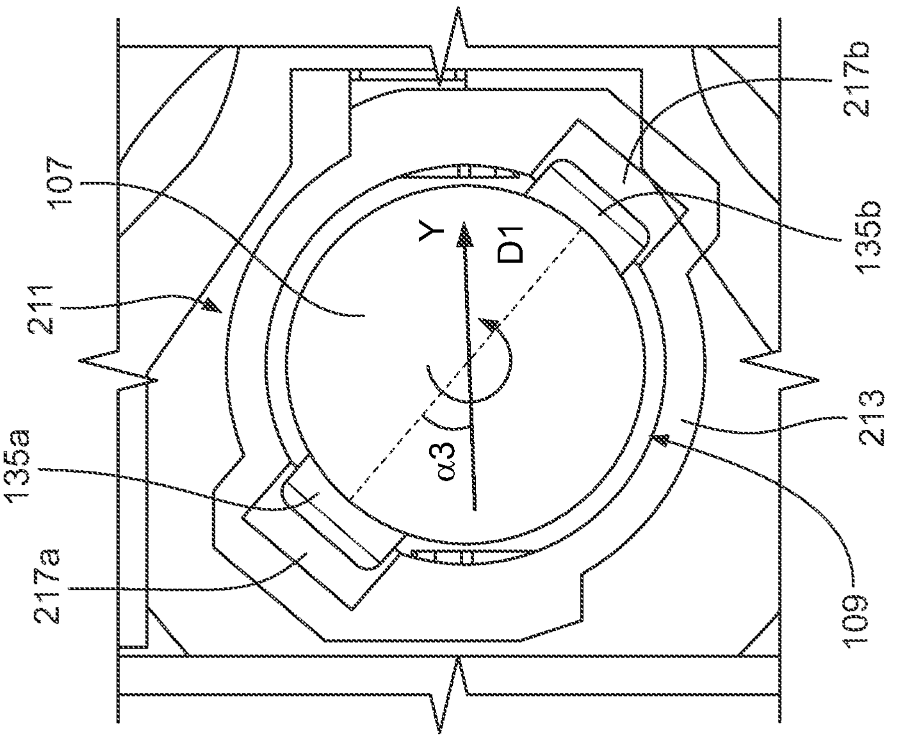
FIG. 3B shows a detailed view of the receiving element 211 in the state of FIG. 3A.
Figure 3A:
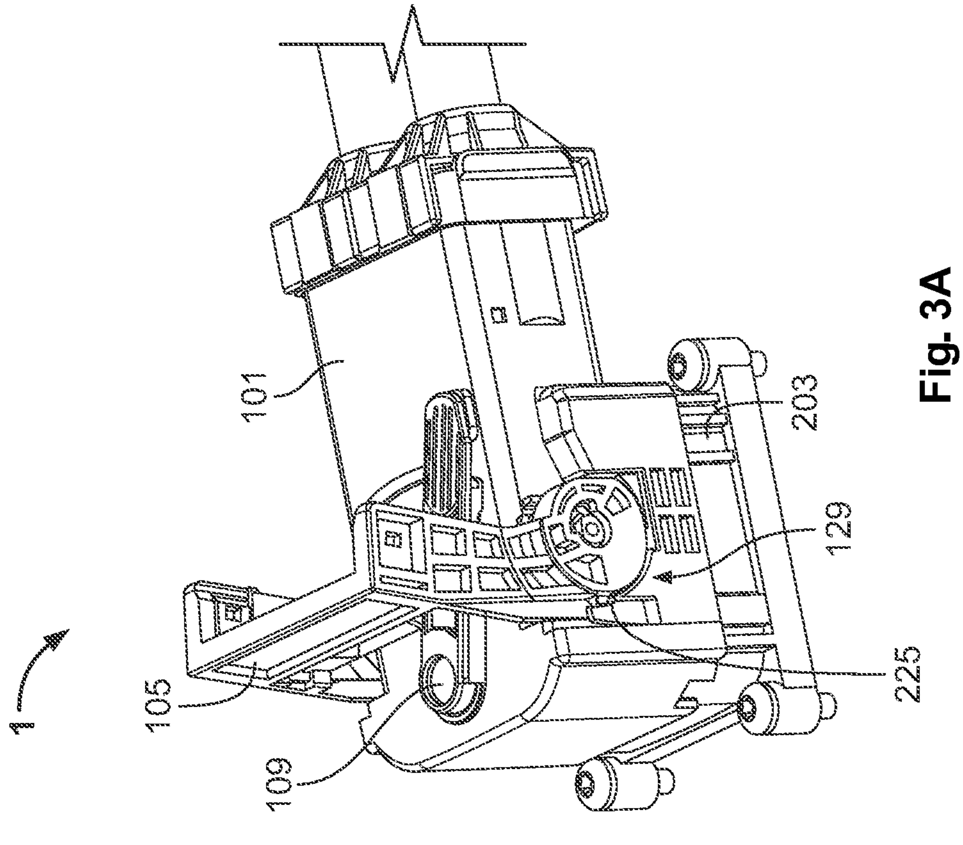
FIG. 3A shows the connector assembly in a plugged-in, uncoupled state.
Figure 4A:
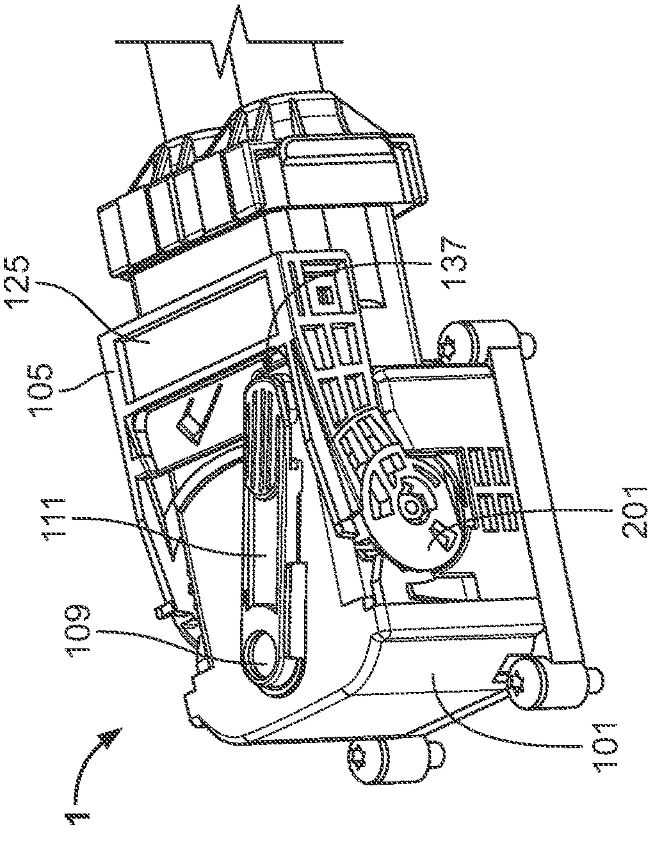
FIG. 4A shows the connector assembly in a plugged-in, coupled state.
Figure 4B:
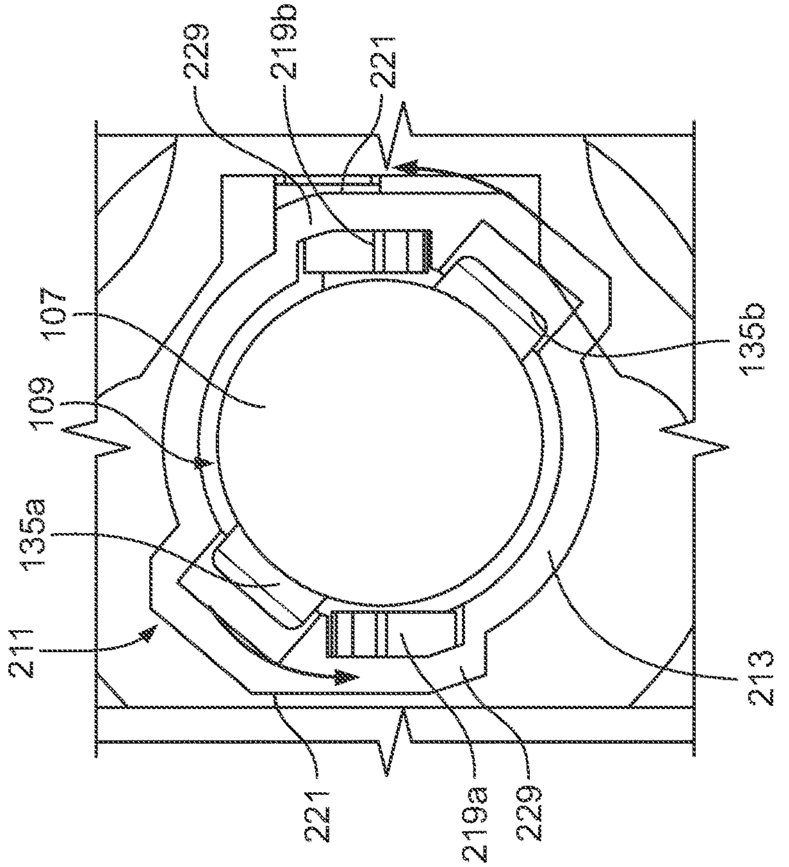
FIG. 4B shows a detailed view of the receiving element 211 in the state of FIG. 4A.
Figure 5B:
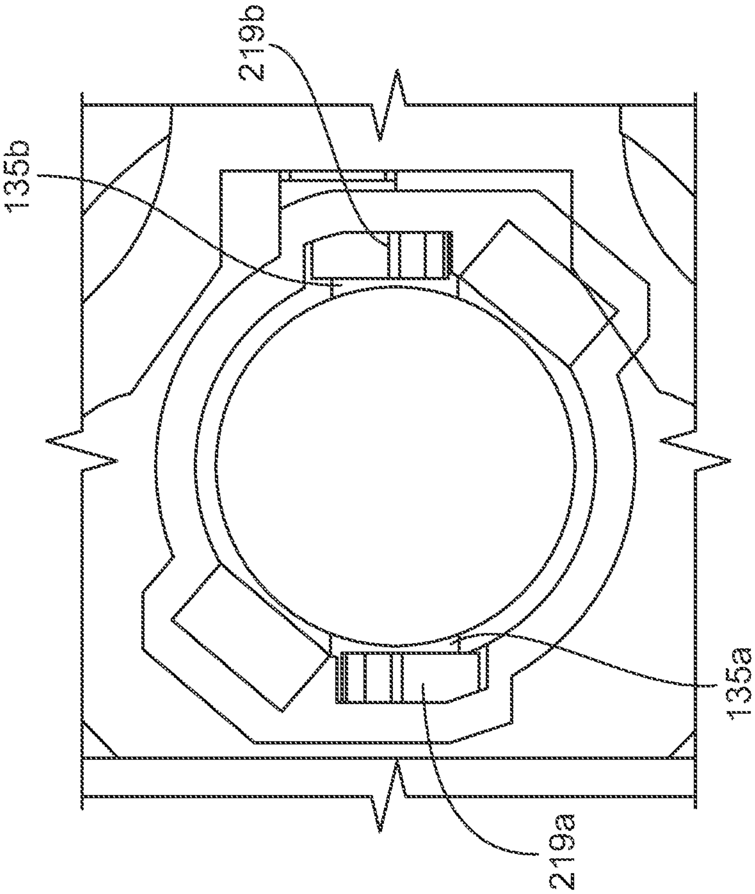
FIG. 5B shows a detailed view of the receiving element 211 in the state of FIG. 5A.
Figure 5A:
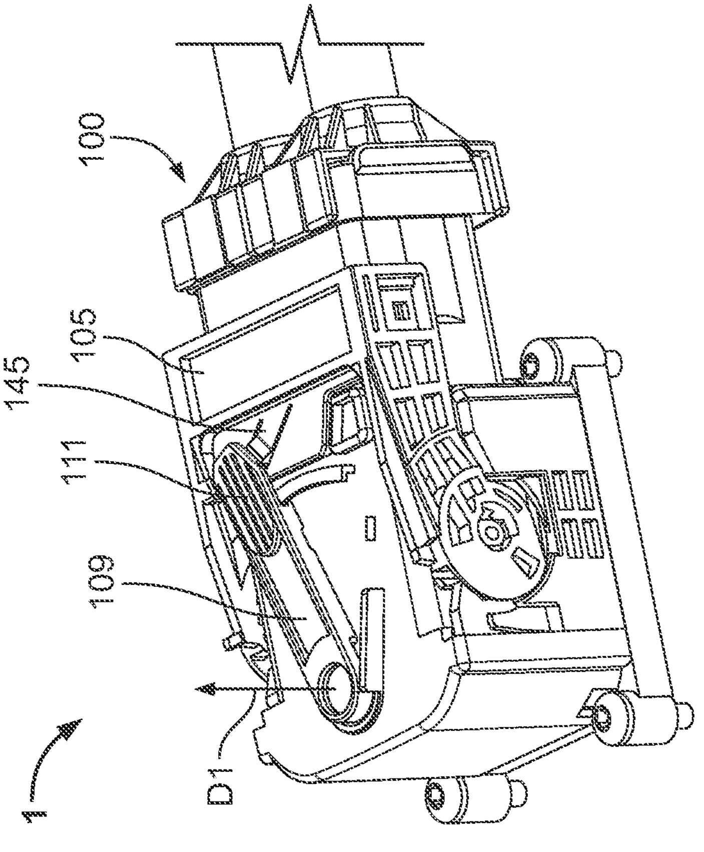
FIG. 5A shows the connector assembly in a plugged-in, coupled and protected state.

FIGS. 3A, 4A, and 5A of the connector assembly 1 show successive steps of coupling the connector assembly 1. FIGS. 3B, 4B, 5B show respective detail views of the position of the housing interlock element 109 with respect to the receiving element 211 in the respective steps of FIGS. 3A, 4A, and 5A. The detail views 3B, 4B, 5B correspond to cross-sectional views along the sectional axis S inscribed in FIGS. 2A and 2B.

In FIG. 3A, the lever 105 is in the first lever position and the housing interlock element 109 is in the pre-latched position. The connector housing 101 is partially plugged onto the mating connector housing 203. However, the connector assembly 1 is still in an electrically uncoupled state. The lever 105 is in the first, open lever position in which the engagement lugs 129 are not yet inserted into the lever handle notches 225 of the mating connector housing 203. Only in this position of the housing interlock element 109 can the plug connector 100 be pushed onto the mating plug connector 200. Only when the housing interlock element 109 is in the pre-latched position are the contact arms 135*a*, 135*b* in an angular position about axis of rotation D2 with respect to the body direction y in which they can be received in the respective notches 217*a*, 217*b* of the guide body 213 of the receiving element 211.

FIG. 3B shows a view in the y-z plane of the receiving element 211 in which the contact arms 135*a*, 135*b* lie in the notches 217*a*, 217*b*. When the contact arms 135*a*, 135*b* are located in the notches 217*a*, 217*b*, they are not blocked along the plug-in direction x, but can slide along the notches 217*a*, 217*b*, such as when the pin-shaped body 107 is inserted in the receiving element 211. In this embodiment, the notches 217*a*, 217*b* are arranged in the guide body 213 offset with respect to the body direction y by an angle α3 of 45° about the axis of rotation D2. Thus, the housing interlock element 109 can be inserted into the receiving element 211 without the guide body 213 blocking the contact arms 135*a*, 135*b* in the plug-on direction.

In FIG. 4A, the connector assembly 1 is in a fully coupled but still unprotected intermediate state. The lever 105 has been moved from the first lever position of FIG. 3A to the second lever position, for example by manual actuation of the cross beam 125. This is possible because the actuation element 111 of the housing interlock element 109 is in the first rotational position. Only then can the lever 105 be brought completely into the second lever position thanks to the recess 137 in the cross beam 125 without the cross beam 125 being blocked by the actuation element 111.

As a result of the leverage force that can be exerted by the engagement lugs 129, the plug connector 100 and mating plug connector 200 were fully coupled by the rotation of the lever 105. By engaging a lug on the spring element of the plug connector 100 in a corresponding recess in the mating plug connector 200, unintentional disengagement of the coupling is prevented. In this position, the coupling of the current transmission contacts also takes place.

FIG. 4B shows, as does FIG. 4A, that the contact arms 135*a*, 135*b* are not yet engaged with the contacts 219*a*, 219*b* of the receiving element 211 in the pre-latched state. However, the contact arms 135*a* and 135*b* are already at the same level with the contacts 219*a*, 219*b* because the connector assembly is fully coupled on the basis of the closing of the lever 105, so that the pin-shaped body 107 of the housing interlock element 109 is fully inserted into the receiving element 211. In this state, the interlock circuit is not yet closed and the current transmission for the interlock circuit is not yet activated.

In this state, the contact arms 135*a*, 135*b* lie in the receiving element 211 such that they can be moved in a circle along the above-mentioned rotational cavity 229 in the receiving element 211 in the thickened part 221 of the guide body 213. The movement space created by the rotational cavity 229 bridges the 45° offset between notches 217*a*, 217*b* and contacts 219*a*, 219*b*. Thus, rotational movement of the contact arms 135*a*, 135*b* of the housing interlock element 109 is no longer blocked in the notches 217*a*, 217*b* of the receiving element 211.

In FIG. 5A, the connector assembly 1 is in the coupled and protected end state with the lever 105 in the second lever position and the housing interlock element 109 in the final latched position. For this purpose, following the plugging on of the connector 100 and the rotation of the lever 105 into the second lever position, the housing interlock element 109 was moved into the final latched position. For this purpose, the actuation element 111 was moved manually in a circle around the axis of rotation D1 from the first to the second rotational position. In the process, the actuation element 111 was partially pushed over the cross beam 125 of the lever 105, so that the lever 105 is positively locked in the second lever position.

Upon sliding the actuation element 111 over the cross beam 125, the actuation element 111 has also displaced the resilient securing element 145 projecting from the surface of the cross beam 125 from its rest position. When the actuation element 111 passes the elastic securing element 145 into the second rotational position, the securing element 145 snaps back into its rest position and blocks a return of the actuation element 111. In this way, the housing interlock element 109 is positively secured in the final latched position and the connector assembly 1 is locked.

FIG. 5B shows the electrical contact of the contact arms 135*a*, 135*b* with the contacts 219*a*, 219*b*. The interlock circuit is closed via the metallic pin 133 and the electrical current transmission is activated. Thus, the current transmission is not activated until the lever 105 is in the second lever position in which the coupling of the connector assembly 1 is complete. Additionally, in this position, the metallic contact arms 135*a*, 135*b* projecting from the pin-shaped body 107 are in the rotational cavity 229. The positive connection of the projecting metallic contact arms 135*a*, 135*b* in the rotational cavity 229 blocks a relative movement against the plug-in direction x of the housing interlock element 109 with respect to the receiving element 211. Thus, the locked connector assembly can be subjected to increased mechanical loads and is protected against vibrations. In this way, the risk of an electrical or mechanical accident during use of the connector assembly can also be reduced.

To release the connector assembly 1, the housing interlock element 109 must first be rotated back from the second rotational position in the final latched state back to the first rotational position in the pre-latched state. In the first rotational position, the contact arms 135*a*, 135*b* projecting from the pin-shaped body 107 are no longer in the rotational cavity 229 but in the notches 217*a*, 217*b*, and thus the blocking of the metallic contact arms 135*a*, 135*b* against the plug-in direction x is canceled. Only then is the lever 105 also no longer blocked by the actuation element 111, and the lever 105 can be actuated to release the connector assembly 1. In this way, it is simultaneously and additionally ensured that the interlock circuit opens and the electrical current transmission is interrupted before the lever 105 can be actuated and the connector assembly 1 can be unlocked.

In this embodiment of the invention, when assembling the connector assembly 1, a further step of checking the state of the housing interlock 109 is obsolete, since the interlock circuit can only be closed in the final latched state. Thus, assembly of the connector assembly is faster and easier.

In the above described embodiment, the switching element of the connector assembly according to the invention is configured as the electrically conductive element 131 comprising the metallic pin 133 having projecting ends 135*a*, 135*b*. In an alternative embodiment, the switching element is a protrusion formed on the surface of the pin-shaped body 107. The protrusion is located at the end of the pin-shaped body 107 facing in the plug-in direction x, and projects transversely to the plug-in direction x. Preferably, the positioning and geometric shape of the protrusion on the pin-shaped body 107 may correspond to the positioning and geometric shape of the end 135*a* or the end 135*b* of the embodiment described above.

In this alternative embodiment, the receiving element 211 includes a switch, wherein the electrical contacts of the mating plug connector 200 are arranged to be short-circuited by the switch. Preferably, the switch is located at the level of the rotational cavity 229. Thus, with the movement of the housing interlock element from the pre-latched position to the end-latched position, i.e., the rotation of the pin-shaped body about the axis D1, the switch can be flipped by the protrusion to short-circuit the electrical contacts in the mating plug connector. During a backward movement from the final latched position back to the pre-latched position, the protrusion moves back to the initial position. Thus, the shorting of the electrical contacts of the mating plug connector is released and the interlock circuit is opened, as known from the preceding embodiment. In this alternative embodiment, the underlying problem can also be solved and the advantages of the invention can be achieved.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector assembly, comprising:
an electrical plug connector, including:
a connector housing; and
a housing interlock element movable relative to the connector housing between a pre-latched position and a final latched position, the housing interlock element including a switching element including a protrusion projecting transversely with respect to a plug-in direction of the connector assembly; and
a mating plug connector securable to the connector housing via the housing interlock element, the mating plug connector including a receiving element adapted to receive the housing interlock element in the plug-in direction, the receiving element including two electrical contacts of an electrical interlock circuit, the switching element adapted to electrically connect the two electrical contacts when the housing interlock element is moved into the final latched position, wherein in the final latched position the protrusion of the switching element is received in a recess defined in the receiving element and arranged transversely to the plug-in direction.

2. The connector assembly according to claim 1, wherein the receiving element includes a switch, and the switching element is adapted to close the switch and to short circuit the two electrical contacts as the housing interlock element is moved into the final latched position.

3. The connector assembly according to claim 1, wherein the switching element includes an electrically conductive element adapted to electrically contact the two electrical contacts in the final latched position.

4. The connector assembly according to claim 1, wherein in the final latched position the housing interlock element is positively received in the receiving element such that relative movement of the plug connector with respect to the mating plug connector is prevented.

5. The connector assembly according to claim 4, wherein in the pre-latched position of the housing interlock element relative movement between the plug connector and the mating connector is enabled.

6. The connector assembly according to claim 1, wherein the housing interlock element has a pin-shaped body extending along the plug-in direction along which the plug connector is plugged onto the mating plug connector, and the protrusion of the switching element projects transversely at a first end of the pin-shaped body facing the plug-in direction.

7. The connector assembly according to claim 1, wherein at least one of the receiving element or the housing interlock element is adapted to enable mating of the plug connector and the mating plug connector only when the housing interlock element is in the pre-latched position.

8. The connector assembly according to claim 1, wherein:
the connector housing further includes a lever adapted to mate the plug connector and the mating connector as the lever is pivoted from a first lever position to a second lever position;
the housing interlock element is movable between the pre-latched position and the final latched position independently of the movement or position of the lever; and
in the final latched position the housing interlock element is positively received in the receiving element such that relative movement of the plug connector with respect to the mating plug connector is prevented independently of the position of the lever.

9. An electrical plug connector, comprising:

a connector housing; and a housing interlock element adapted to secure the connector housing to a mating connector, the housing interlock element movable relative to the connector housing between a pre-latched position and a final latched position, the housing interlock element having a switching element including an electrically conductive element, wherein the electrically conductive element comprises a metallic pin extending transversely to a plug-in direction through the housing interlock element, the plug-in direction is a direction in which the plug connector is adapted to be plugged onto the mating plug connector.

10. The plug connector according to claim 9, wherein the housing interlock element comprises a pin-shaped body extending along the plug-in direction in the connector housing.

11. The plug connector according to claim 10, wherein the housing interlock element is rotatable in the connector housing about an axis of rotation extending parallel to the plug-in direction and through the pin-shaped body from a first rotational position to a second rotational position, wherein the first rotational position corresponds to the pre-latched position and the second rotational position corresponds to the final latched position.

12. The plug connector according to claim 10, wherein at least one end of the electrically conductive element forms a protrusion projecting transversely to the plug-in direction with respect to the pin-shaped body.

13. The plug connector according to claim 11, wherein the housing interlock element further comprises an actuation element adapted to manually move the housing interlock element between the first and the second rotational position, wherein the actuation element is connected to the pin-shaped body at a second end opposite to a first end thereof and is arranged on an outer surface of the connector housing facing opposite to the plug-in direction.

14. The plug connector according to claim 13, wherein the connector housing further comprises a lever adapted to mate the plug connector and the mating connector as the lever is pivoted from a first lever position to a second lever position.

15. The plug connector according to claim 14, wherein the actuation element is adapted such that pivoting of the lever from the first lever position to the second lever position is only enabled when the actuation element is arranged in the first rotational position.

16. The plug connector according to claim 15, wherein in the second rotational position, the actuation element blocks the pivoting of the lever from the second lever position to the first lever position.

17. The plug connector according to claim 15, wherein the lever comprises a resilient securing element which, in the second lever position, releasably locks the actuation element of the housing interlock element by positive locking in the second rotational position.

18. An electrical plug connector, comprising:

a connector housing; and a housing interlock element adapted to secure the connector housing to a mating connector, the housing interlock element movable relative to the connector housing between a pre-latched position and a final latched position, the housing interlock element having a switching element including an electrically conductive element, the housing interlock element is rotatable in the connector housing about an axis of rotation extending parallel to a plug-in direction of the plug connector and through a body of the housing interlock element from a first rotational position to a second rotational position, wherein the first rotational position corresponds to the pre-latched position and the second rotational position corresponds to the final latched position.

19. An electrical plug connector, comprising:

a connector housing; and a housing interlock element adapted to secure the connector housing to a mating connector, the housing interlock element rotatable relative to the connector housing between a first rotational position corresponding to a pre-latched position and a second rotational position corresponding to a final latched position, the housing interlock element having:

a body;

a switching element including an electrically conductive element; and an actuation element adapted to manually move the housing interlock element between the first and the second rotational position, wherein the actuation element is connected to the body at a second end opposite to a first end thereof and is arranged on an outer surface of the connector housing facing opposite to a plug-in direction of the electrical plug connector.

20. The plug connector according to claim 19, wherein the housing interlock element is rotatable in the connector housing about an axis of rotation extending parallel to the plug-in direction and through the body from the first rotational position to the second rotational position.

* * * * *